United States Patent [19]

Priest

[11] Patent Number: 4,637,258

[45] Date of Patent: Jan. 20, 1987

[54] PRESSURE DIFFERENTIAL CONTROL MECHANISM

[75] Inventor: Wayne A. Priest, Kansas City, Kans.

[73] Assignee: SOR, Inc., Olathe, Kans.

[21] Appl. No.: 791,681

[22] Filed: Oct. 25, 1985

Related U.S. Application Data

[63] Continuation of Ser. No. 551,027, Nov. 14, 1983, abandoned.

[51] Int. Cl.[4] .................... G01L 7/08
[52] U.S. Cl. .................... 73/716; 73/706
[58] Field of Search .................... 73/716-722, 73/706; 200/83 A, 83 W

[56] References Cited

U.S. PATENT DOCUMENTS 3,085,437 4/1963 Osterstrom .................... 73/716

*Primary Examiner*—Donald O. Woodiel
*Attorney, Agent, or Firm*—Kokjer, Kircher, Bradley, Wharton, Bowman & Johnson

[57] ABSTRACT

A movable piston is supported by a flexible angular membrane around the perimeter of the piston in a piston chamber, having opposed walls which confront the opposite faces of the piston. The chamber has low and high pressure sides at said opposite sides of the piston. The potential movement of the piston is limited by contact of the piston face with the chamber wall, with the entire resistance to piston movement beyond the limit point being born by the chamber. The piston controls activation of an electric switch in response to movement of the piston.

2 Claims, 4 Drawing Figures

Fig. 1.
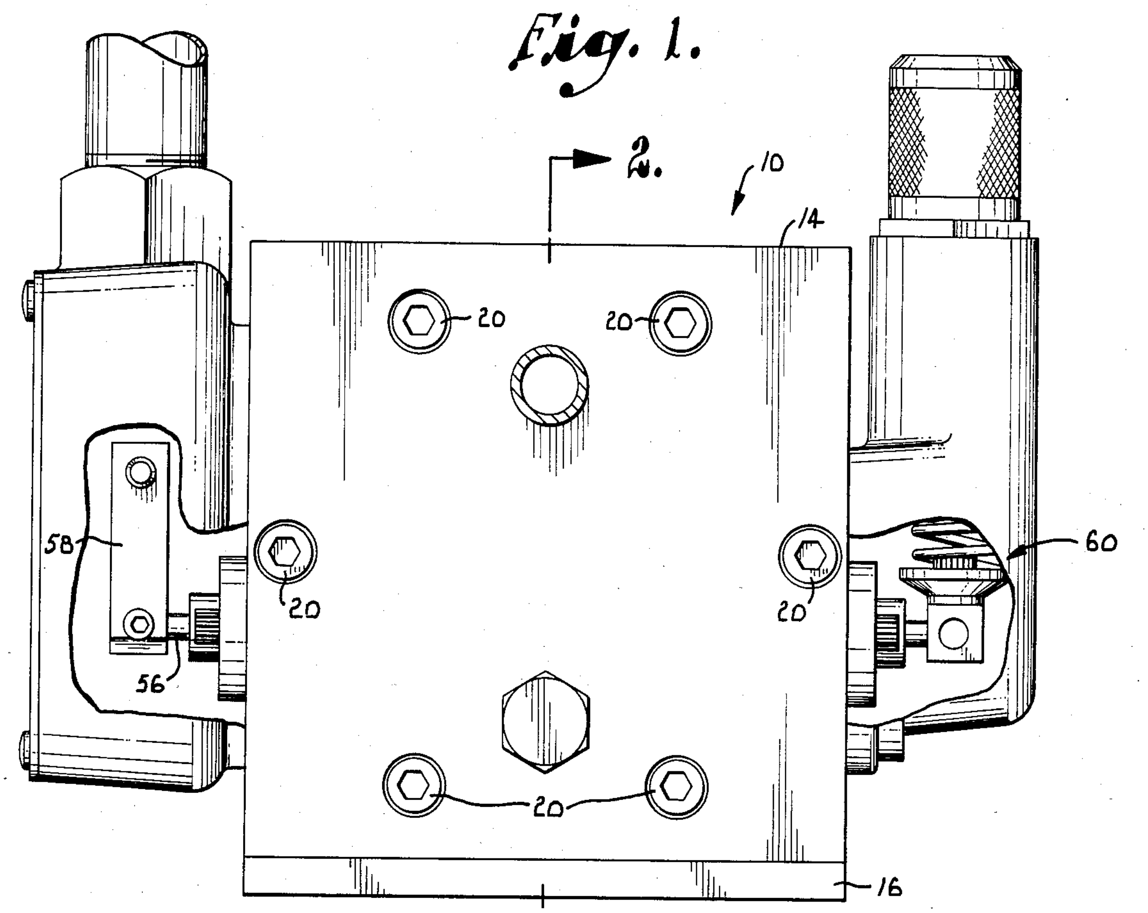
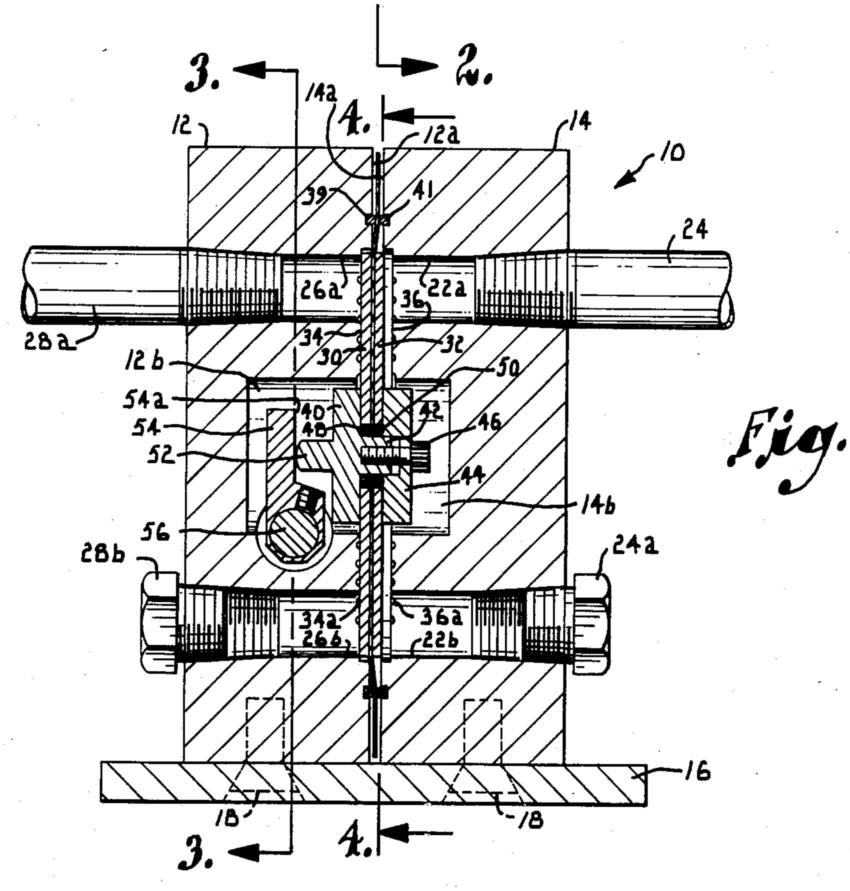
Fig. 2.

PRESSURE DIFFERENTIAL CONTROL MECHANISM

This is a continuation of application Ser. No. 551,027, filed Nov. 14, 1983, now abandoned.

BACKGROUND OF THE INVENTION

This invention relates generally to fluid pressure actuated control devices and has to do more particularly with such a control device having sensitivity to and actuated in response to a change in pressure differential between low and high sides of a fluid system.

In my earlier U.S. Pat. No. 4,323,742, issued Apr. 6, 1982, I disclose a differential pressure switch incorporating several valuable features relating to high pressure operations, including shock resistance, corrosion prevention and ease of maintenance. The present invention has generally the same features but is characterized most particularly in three important aspects of improvement of the pressure sensing assembly;

(1) a much superior ability to respond quickly and without fail upon the occurrence of a change in the pressure differential;

(2) a much superior ability to accommodate and respond reliably to an extremely small pressure differential settings; and (3) a substantially better sealing protection preventing leaking or blow-by of high pressure fluids through the sensing and actuating mechanism, either into the low pressure side of the fluid system or into contact with protected operating components of the switch assembly.

The switch operating assembly of the earlier patent includes a pressure sensing piston which travels axially within a cylinder bore in response to changes in pressure differential across the piston. The piston includes a flexible O-ring seal which engages the cylinder bore around the perimeter of the piston. The O-ring seal creates a resistance to axial movement which must be overcome before the piston will commence travel and also acts as brake during movement, both of which must be compensated for in the design of the actuating mechanism and limit to some extent the sensitivity of response of the piston to changes in pressure differential. In addition, repeated cyclings can result in a change in resistance to piston travel which can, in low pressure differential sensing, affect the reliability of the switch and require careful surveillance and maintenance.

SUMMARY OF THE INVENTION

The advantages of my new control assembly are achieved principally by providing an arrangement in which the movable pressure sensing piston between the high and low pressure side is supported in a manner to avoid any elastomer to metal or other frictional contact between the piston and the chamber wall in which it travels. This is achieved by supporting the piston perimeter on a membrane of flexible material with the perimeter of the piston spaced from and free from contact with the piston chamber. The outer margin of the membrane is anchored to the chamber wall and serves in effect to suspend the piston freely in the chamber with the only resistance to movement being the opposed pressure, the resistance to flexure of the web and the set resistance to movement of the actuating linkage between the piston and the switch.

The manner of construction and assembly of the piston and the film which forms the membrane with each other and with the chamber is also a valuable feature of the invention. A tight leak-proof seal is achieved while still providing the required sensitivity to low pressure differentials.

Other and further objects and features of the invention, together with the features of novelty appurtenant thereto, will appear during the course of the following description.

DETAILED DESCRIPTION OF THE INVENTION

In the accompanying drawings, which form a part of the specification and are to be read in conjunction therewith, and in which like reference numerals indicate like parts in the various views:

FIG. 1 is a front elevational view of a switch assembly embodying the preferred form of the invention, parts being broken away and other parts shown in section for the purposes of illustration;

FIG. 2 is a sectional view taken generally along line 2—2 of FIG. 1 in the direction of the arrows;

The housing member 14 is ported with a pair of ports *22a, 22b* for communication with the high pressure side of a fluid system (not shown). Only one port is normally connected, such as by pipe 24, which is the normal connection for liquid service. In liquid service, the bottom port is plugged, as by plug *24a*. In gas service, the reverse arrangement is employed, with port *22a* plugged by plug *28b* and port *22b* connected with pipe 24. The ports *22a, 22b, 26a* and *26b* are preferably located so that their inner ends are adjacent the rim of the piston cavity hereinafter described. Housing member 12 is similarily ported with ports *26a, 26b* which connect with a pipe *28a* from the low pressure side. The plugs *24b, 28b* can be removed to permit drainage of trapped liquids, and if in the upper ports, can be removed for venting of trapped gas.

Figure 3:
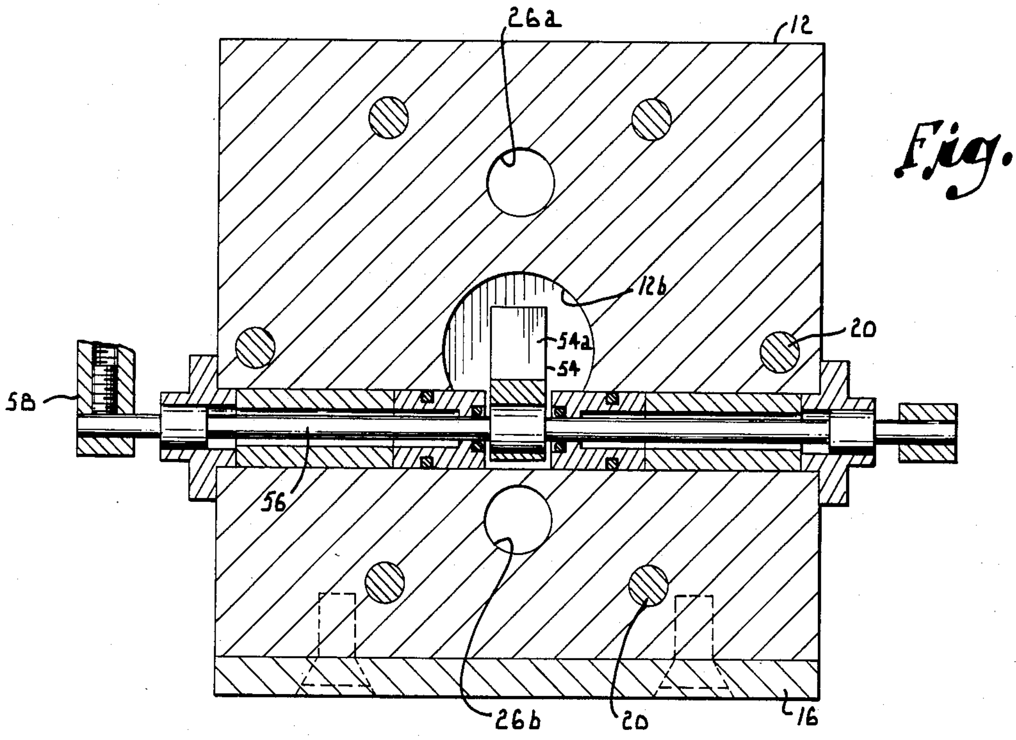
FIG. 3 is a sectional view taken generally along line 3—3 of FIG. 2 in the direction of the arrows.

The switch assembly includes a housing 10 which, in the illustrated embodiment, is made up of two halves 12 and 14 having the confronting faces *12a, 14a*. As shown in FIG. 2, the halves are secured at their lower ends to a base plate 16, preferably by the screws 18. They are also joined together by the Allen head bolts 20 which extend through shouldered apertures in part 14 of the housing and into tapped apertures aligned with the apertures and formed in and extending inwardly from the face *12a* of housing member 12 (See FIGS. 3 and 4).

Figure 4:
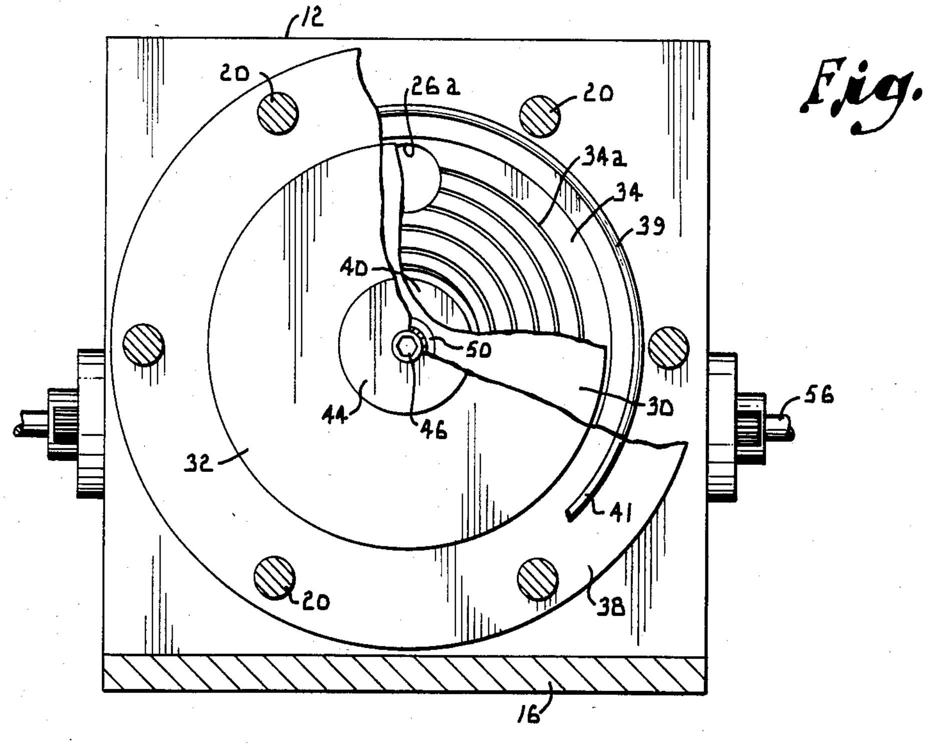
FIG. 4 is a sectional view taken generally along line 4—4 of FIG. 2 in the direction of the arrows, parts being broken away and parts shown in section for purposes of illustration.

The differential pressure actuated piston for the switch is an assembly of parts which are best seen in FIGS. 2 and 4. The principal components comprise a pair of parallel circular plate-like members 30 and 32 which are positioned within a chamber defined by confronting circular recessess 34 and 36 formed respectively in the inner or confronting faces *12a* and *14a* of the housing members. The diameters of recesses 34 and 36 are slightly greater than the diameter of the plate members so that there is a slight annular clearance space around the perimeter of the plate members, i.e., between the rims of the plate members and the circular edge defining shoulders of the recesses. The depth of the recesses is such as to permit limited movement of the plate members in an axial direction. For reasons subsequently to be explained, the faces of recesses 34 and 36 are each provided with a continuous spiral groove *34a, 36a* (See FIGS. 2 and 4). Portions of the groove intersect the ports *22a, 22b* and *26a, 26b.*

The plate members have sandwiched therebetween a sheet 38 of a thin fluid impermeable film, which preferably is an uncoated or Teflon coated (both sides) polyimide film. Such a film is produced by duPont under the trademark "KAPTON" type H or F. It is synthesized by a polycondensation reaction between an aeromatic dianhydride and an aeromatic diamone. Other films which are fluid impermeable may be used when conditions permit or require.

Sheet 38 is of an outside dimension such as to cause it to extend well beyond the edges of the recesses and perimeters of the plate members to define an annular membrane connecting the perimeter of the piston with the outside wall of the chamber. As shown in FIG. 4, it in fact extends beyond the locations of the connector bolts 20 and is perforated so that the bolts may pass therethrough thereby to anchor the sheet 38 firmly in position thus to support the plate members in the chamber defined by the recesses.

The extending portion of the sheet 38 is sealed completely around the unrecessed portions of faces 12*a* and 14*a* by O-rings 39 and 41 which are partially seated in corresponding grooves formed in the faces. It will be understood that while FIG. 2 shows the housing members 12 and 14 as separated (this is principally for illustration purposes), the bolts 20, when tightened down, will cause the O-rings 39 and 41 to be deformed and to tightly contact the opposite faces of the sheet thereby to form a complete sealing circle all the way around the rings.

The plates 30 and 32 are secured together and to the sheet 38 by means of a central securing mechanism which includes the cylindrical body 40 having a centrally located stub shaft 42 projecting through a corresponding opening in the center of the membrane, an opposing body 44 on the other side of the sheet and having a central bore which receives the outer end of the stub shaft 42, and an attaching bolt 46 which extends into a suitably tapped bore in the stub shaft. The faces of the recesses 34 and 36 are counterbored to provide cylindrical cavities 12*b* and 14*b* within which the bodies 40 and 44 are positioned. The plates 30 and 32 have central apertures which are of greater diameter than the diameter of the stub shaft and the space between the edges of those apertures and the surface stub shaft are filled by elastomeric O-rings 48 and 50.

The body 40 has a protruding stem 52 which engages the side of a switch operating lever 54 in which turn is secured to a rotary cross shaft 56. Note that the face 54*a* of lever 54 is located so that the point of contact of the end of stem 52 with face 54*a* is vertically above the axis of cross shaft 56. The cross shaft carries at one end the switch operating lever 58 (See FIG. 1) and at the other the adjustable biasing assembly 60 which is employed to vary the pressure settings for switch operation.

The details of the switch actuating linkage are, except for the lever 54 and stem 52, the same as and are fully disclosed in the arrangement embodied in my aforementioned U.S. Pat. No. 4,323,742 to which reference may be made for further information.

The operation of the switch actuating mechanism is likewise essentially the same in principle as is disclosed in the aforesaid patent. However, in the present invention the piston members 30 and 32 are supported free from any frictional contact with the chamber in which they are located during movement in response to change in pressure differential. The flexibility of the membrane permits movement of the piston in response to very, very low pressure differentials and the membrane further provides a continuous barrier to any intrusion of fluids from the high pressure side to the low pressure during operation.

The depth of the recess 34 on the low pressure side is slightly more than enough to permit the piston assembly to displace the actuating linkage the displacement necessary to trip the switch with a slight additional movement to ensure the switch remains tripped. At this point, the plate 30 contacts and bears against the face of the recess 34. Substantially all of the pressure load is thus taken up by the plate-like members and only a very limited load is applied to the annular membrane. This provides a very desirable protection against rupture and enables the unit to successfully resist extremely high pressures and the risk of a blow-out.

As earlier noted, the faces of recesses 34 and 36 are provided with spiral grooves which intersect the ports *22a, 22b* and *26a, 26b.* Preferably, they also connect with the central cavities *12b, 14b.* The purpose is to break up the surfaces of the recesses and to permit liquid flow between the piston members and faces thereby to avoid surface tension locking of the contacting surfaces of the piston members to the recess faces.

While I have disclosed the principles of my invention specifically for use with a switch operating mechanism like that of my U.S. Pat. No. 4,323,742, it should be understood that the pressure differential sensing assembly can be used to effect control of other mechanisms which are used to effect operational changes in response to changes in pressure differential.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the herein set forth as shown in the accompanying drawings is to be interpreted as illustrative and not in a limiting sense.

Having thus described my invention, I claim:

1. An operating assembly for sensing changes in a pressure differential between the high and low sides of a fluid system and translating said changes into movement of a control operating member, said assembly including:

a housing containing a chamber having an outer annular portion defined by confronting parallel walls, an intermediate portion contiguous with said outer annular portion, of substantially greater depth than said annular portion and also defined by confronting parallel walls, and a central piston receiving portion of greater depth than said intermediate portion, a piston assembly located within said chamber said piston assembly having a high pressure side and an opposed low pressure side, said piston assembly including (a) A disk-like outer portion fitting into the intermediate portion of said chamber with opposite faces on the disk-like portion parallel to and confronting the respective walls of the intermediate portion of the chamber, the perimeter of said disk-like portion being slightly spaced inwardly from the inward perimeter of said annular portion of said chamber, (b) A central piston body affixed to said disk-like portion and located in the said central portion of said chamber, and (c) A flexible, fluid impermeable membrane extending between the perimeter of said disk-like portion and outer perimeter of said annular portion of said chamber and defining with said disk-like outer portion and piston body an uninterrupted barrier dividing said chamber into high and low pressure sides, means for communicating the pressures on the low and high pressure sides of said fluid system with the low and high pressure sides of said piston assembly, said membrane permitting movement of said piston assembly in response to a positive pressure differential to bring the low pressure side face of said disk-like portion into bearing contact with the confronting wall of the intermediate portion of said chamber thereby to cause substantially all of the load imposed by the high pressure on said piston assembly to be imposed on said confronting wall, and control means associated with and operable responsive to movement of said piston body caused by changes in pressure differential in said system.

2. A control operating assembly as in claim 1, one of the contacting faces of said disk-like portion and wall of said intermediate portion having a non-planar configuration whereby to inhibit surface to surface locking in the presence of fluid.

* * * * *